(12) United States Patent
Sherwood et al.

(10) Patent No.: US 10,526,215 B2
(45) Date of Patent: Jan. 7, 2020

(54) SELENIUM AND OTHER CONTAMINANTS REMOVAL PROCESS

(71) Applicant: THE FRAZER AND CRUICKSHANK LIVING TRUST DATED 3/24/1982, Christiansted, VI (US)

(72) Inventors: Nancy S. Sherwood, Wellsville, OH (US); Matthew T. Luebbers, Fairlawn, OH (US); Rebecca H. Carroll, Yorkville, OH (US)

(73) Assignee: THE FRAZER AND CRUICKSHANK LIVING TRUST, Christiansted, VI (US), DATED 3/24/1982

( * ) Notice: Subject to any disclaimer, the term of this patent is extended or adjusted under 35 U.S.C. 154(b) by 379 days.

(21) Appl. No.: 14/802,480

(22) Filed: Jul. 17, 2015

(65) Prior Publication Data

US 2016/0016818 A1 Jan. 21, 2016

Related U.S. Application Data

(60) Provisional application No. 62/026,753, filed on Jul. 21, 2014.

(51) Int. Cl.
*C02F 1/28* (2006.01)
*C02F 1/42* (2006.01)
(Continued)

(52) U.S. Cl.
CPC ............... *C02F 1/281* (2013.01); *C02F 1/42* (2013.01); *C02F 1/705* (2013.01);
(Continued)

(58) Field of Classification Search
CPC ........................... C02F 1/281; C02F 2101/106
See application file for complete search history.

(56) References Cited

U.S. PATENT DOCUMENTS

| 4,824,576 A | 4/1989 | Sood et al. |
| 5,092,563 A | 3/1992 | Fehsenfeld et al. |

(Continued)

FOREIGN PATENT DOCUMENTS

WO WO 2011016038 A1 * 2/2011 ............. B01J 20/06

OTHER PUBLICATIONS

Trussell et al, Selenium Removal From Ground Water Using Activated Alumina, Aug. 1980, retrieved on Aug. 8, 2017. Retrieved from the internet <URL: https://nepis.epa.gov>. 161 pages.*

(Continued)

*Primary Examiner* — Matthew O Savage
(74) *Attorney, Agent, or Firm* — Wilmer Cutler Pickering Hale and Dorr LLP

(57) ABSTRACT

A system for reducing a level of metallic contaminants from an aqueous stream is described, including at least one of an aluminum oxide sorption media and an ion exchange media (media 1) and a functionalized activated alumina media (media 2), wherein the system is configured to:

a. lower the pH of the metallic contaminant -contaminated aqueous stream to less than 6,
b. contact the metallic contaminated aqueous stream with at least one of the aluminum oxide sorption media and the ion exchange media (media 1)
c. contact the metallic contaminant-contaminated aqueous stream with the functionalized activated alumina media (media 2) wherein the contact with the at least one of the aluminum oxide sorption media and the ion exchange media and the functionalized activated alumina media forms a metallic contaminant-reduced aqueous solution; and (Continued)

d. discharge a metallic contaminant-depleted aqueous solution.

15 Claims, 3 Drawing Sheets

(51) Int. Cl.
*C02F 1/70* (2006.01)
*C02F 101/20* (2006.01)
*C02F 101/00* (2006.01)
*C02F 101/10* (2006.01)

(52) U.S. Cl.
CPC .. *C02F 2101/006* (2013.01); *C02F 2101/106* (2013.01); *C02F 2101/20* (2013.01); *C02F 2209/06* (2013.01)

(56) References Cited

U.S. PATENT DOCUMENTS

| | | | |
|---|---|---|---|
| 6,599,429 B1 | 7/2003 | Azizian | |
| 7,160,465 B2 | 1/2007 | Kirts et al. | |
| 7,326,346 B2 | 2/2008 | Lovell et al. | |
| 7,419,606 B2 | 9/2008 | Johnson et al. | |
| 8,596,205 B2 * | 12/2013 | Driver | A47B 95/043 108/27 |
| 2003/0196944 A1 | 10/2003 | Tanner et al. | |
| 2005/0194320 A1 * | 9/2005 | Kennard | B01D 15/00 210/688 |
| 2010/0213104 A1 * | 8/2010 | Hughes | B01J 20/0266 208/293 |
| 2011/0203993 A1 * | 8/2011 | Hughes | B01J 20/103 210/638 |
| 2011/0290733 A1 | 12/2011 | Vogler et al. | |

OTHER PUBLICATIONS

General Electric Corporation, Chapter 31—Open Recirculating Cooling Systems, Jan. 2008, retrieved on Aug. 8, 2017. Retrieved from the internet <URL:https://www.gewater.com/handbook/cooling_water_systems/ch_31_open.jsp>. 9 pages.*
International Search Report and Written Opinion dated Oct. 23, 2015 in the international application No. PCT/US2015/041108, filed Jul. 20, 2015, 16 pages.

* cited by examiner

SELENIUM AND OTHER CONTAMINANTS REMOVAL PROCESS

CROSS REFERENCE TO RELATED APPLICATION

This application claims priority to U.S. Patent Application 62/026,753 filed on Jul. 21, 2014, which is hereby incorporated by reference in its entirety.

FIELD OF THE INVENTION

The present invention relates to functionalized activated alumina media in combination with activated alumina media or ion exchange media and low pH adjustment and its application for the removal of metallic and non-metallic contaminants, e.g., selenium, from fluid streams.

BACKGROUND OF THE INVENTION

Selenium is a chemical element whose concentration in fluid and vapor streams is governed by enforceable regulations in both drinking water and industrial discharges. It is often present in aqueous streams along with other contaminants, such as mercury, fluoride and arsenic. Selenium salts are toxic in large amounts to humans, fish and animals. Selenium occurs at approximately 0.7 milligrams per liter in the earth's crust and concentrates in plants, sulfur deposits, sulfide minerals of copper and molybdenum and fossil fuels. The contaminant is prevalent in many waste streams including those that result from copper mining, coal mine drainage, coal-fired power plants, agricultural runoff and petroleum production and refining. It may also be present from glassmaking, pigments, and electronics manufacturing. Selenium is under increasing government regulation and worldwide corporate scrutiny. The removal of selenium from aqueous fluids to levels as low as 5 parts per billion is a focus of the mining, agriculture, power generation and oil and gas industry sectors and much attention is given to proper handling and disposal of waste materials classified as hazardous or toxic. Primary sources are the selenium impurities in metal sulfide ores, where it partially replaces the sulfur.

The chemistry of selenium is a polyatomic nonmetal sometimes considered a metalloid that rarely occurs in its elemental state in nature or as pure ore compounds. In water, selenium generally is present as an oxyanion or as an organic compound. There are two primary oxyanion species, selenite and selenate.

Selenium, especially the selenate oxyanion, is not effectively removed by many processes, substances or methods. Typical adsorbent medias such as activated carbon, organoclays or plain activated alumina do not remove significant levels of selenium and are ineffective in achieving emerging targets of 5 parts per billion in water streams. Functionalized activated alumina has been used as an absorbent of selenium compounds. Occasionally in streams where selenium is present as selenate and in the presence of certain anions and levels of ionic strength, the selenium removal by functionalized alumina is not well-sustained. This represents a problematic and often prohibitive loss in media bed life and capacity.

SUMMARY OF THE INVENTION

In an aspect a system for reducing a level of metallic contaminants from an aqueous stream, wherein the system is configured to:

a. lower the pH of a metallic contaminant-contaminated aqueous stream to a pH of less than 6;
b. contact the metallic contaminant-contaminated aqueous stream with at least one of an aluminum oxide sorption media and an ion exchange media;
c. contact the metallic contaminant-contaminated aqueous stream with a functionalized activated alumina media, wherein contacting the metallic contaminant-contaminated aqueous stream with (1) the at least one of the aluminum oxide sorption media and the ion exchange media and (2) the functionalized activated alumina media forms a metallic contaminant-reduced aqueous solution; and
d. discharge the metallic contaminant-reduced aqueous solution.

In some embodiments, said contacting the metallic contaminant-contaminated aqueous stream with at least one of the aluminum oxide sorption media and the ion exchange media is followed by said lowering the pH of a metallic contaminant-contaminated aqueous stream to a pH of less than 6, and wherein said contacting the metallic contaminant-contaminated aqueous stream with at least one of the aluminum oxide sorption media and the ion exchange media and said lowering the pH of metallic contaminant contaminated aqueous stream precedes said contacting the metallic contaminant-contaminated aqueous stream with the functionalized activated alumina media.

In some embodiments, said lowering the pH of metallic contaminant-contaminated aqueous stream to pH less than 6 is followed by said contacting the metallic contaminant-contaminated aqueous stream with at least one of the aluminum oxide sorption media and the ion exchange media, and wherein said lowering the pH of metallic contaminant contaminated aqueous stream and said contacting the metallic contaminant-contaminated aqueous stream with at least one of the aluminum oxide sorption media and the ion exchange media precedes said contacting the metallic contaminant-contaminated aqueous stream with the functionalized activated alumina media.

In some embodiments, said contacting the metallic contaminant-contaminated aqueous stream with functionalized activated alumina media is carried out at a fixed temperature. In some other embodiments, the fixed temperature is between 32° F. to 212° F.

In some embodiments, the pH is lowered to a range of 1.0 to 4.

In some embodiments, the lowering of the pH of the metallic contaminant-contaminated aqueous stream is carried out by the addition of an acid. In some other embodiments, the pH is lowered by the addition of the acid to the aqueous stream to lower the pH to <5.5. In some other embodiments, the acid is one or more acids selected from the group consisting of a mineral acid, an organic acid and carbonic acid. In some other embodiments, the acid is one or more acids selected from the group consisting of hydrochloric acid, sulfuric acid, nitric acid, phosphoric acid, and formic acid.

In some embodiments, the aluminum oxide sorption media is porous activated alumina. In some other embodiments, the activated alumina media further includes at least one of iron, copper, and manganese.

In some embodiments, the functionalized activated alumina media includes a support substrate of aluminum oxide promoted with at least one of iron and copper and functional groups reacted onto the substrate to act as active bonding sites for the metallic contaminants. In some other embodiments, the active bonding sites for the metallic contaminant removal on the functionalized activated alumina media include at least one of aluminum, sulfur, ammonium, iron and copper compounds.

In some embodiments, the metallic contaminant includes all species of soluble selenium.

In some embodiments, the metallic contaminant includes at least one of selenate, selenite and selenocyanate species.

In some embodiments, the metallic contaminant-contaminated aqueous stream -to-media contact time is 1 minute to 24 hours.

In an aspect a method for reducing a level of metallic contaminants from an aqueous stream includes:
  a. lowering the pH of a metallic contaminant- contaminated aqueous stream to a pH less than 6;
  b. contacting the metallic contaminant-contaminated aqueous stream with at least one of an aluminum oxide sorption media and an ion exchange media; and
  c. contacting the metallic contaminant-contaminated aqueous stream with a functionalized activated alumina media.

In some embodiments, said contacting the metallic contaminant-contaminated aqueous stream with at least one of the aluminum oxide sorption media and the ion exchange media is followed by said lowering the pH of a metallic contaminant-contaminated aqueous stream to a pH of less than 6, and wherein said contacting the metallic contaminant-contaminated aqueous stream with at least one of the aluminum oxide sorption media and the ion exchange media and said lowering the pH of metallic contaminant contaminated aqueous stream precedes said contacting the metallic contaminant-contaminated aqueous stream with the functionalized activated alumina media.

In some embodiments, said lowering the pH of metallic contaminant-contaminated aqueous stream to pH less than 6 is followed by said contacting the metallic contaminant-contaminated aqueous stream with at least one of the aluminum oxide sorption media and the ion exchange media, and wherein said lowering the pH of metallic contaminant contaminated aqueous stream and said contacting the metallic contaminant-contaminated aqueous stream with at least one of the aluminum oxide sorption media and the ion exchange media precedes said contacting the metallic contaminant-contaminated aqueous stream with the functionalized activated alumina media.

In some embodiments, said contacting the metallic contaminant-contaminated aqueous stream with functionalized activated alumina media is carried out at a fixed temperature. In some other embodiments, the fixed temperature is between 32° F. to 212° F.

In some embodiments, the pH is lowered to a range of 1.0 to 4.

In some embodiments, the lowering of pH of the metallic contaminant-contaminated aqueous stream is carried out by the addition of an acid. In some other embodiments, the acid is one or more acids selected from the group consisting of a mineral acid, an organic acid and carbonic acid. In some other embodiments, the acid is one or more acids selected from the group consisting of hydrochloric acid, sulfuric acid, nitric acid, phosphoric acid, and formic acid. In some other embodiments, the pH is lowered by the addition of an acid to the aqueous stream to pH <5.5.

In some embodiments, contacting the metallic contaminant-contaminated aqueous stream with a functionalized activated alumina media forms a contaminant-reduced acidic aqueous solution, the method further includes the steps of:

a. increasing the pH of the contaminant-reduced acidic aqueous solution; and
  b. discharging the metallic contaminant-reduced aqueous solution.

In some embodiments, the metallic contaminant includes at least one of selenium, mercury, arsenic, copper, d-block transition metals, heavy metals, silica, fluoride, cyanide, orthophosphate, inorganic salts, radioactive compounds and organic metallic compounds.

In some embodiments, the aluminum oxide sorption media is porous activated alumina. In some other embodiments, the activated alumina media further includes at least one of iron, copper, and manganese.

In some embodiments, the functionalized activated alumina media includes a support substrate of aluminum oxide promoted with at least one of iron and copper and functional groups reacted onto the substrate to act as active bonding sites for metallic contaminants. In some other embodiments, the active bonding sites for the metallic contaminant removal on the functionalized activated alumina media include at least one of aluminum, sulfur, ammonium, iron and copper compounds.

In some embodiments, the metallic contaminant includes a species of soluble selenium.

In some embodiments, the metallic contaminant includes at least one of selenate, selenite and selenocyanate species.

In some embodiments, the metallic contaminant-contaminated aqueous stream-to-media contact time is 1 minute to 24 hours.

In an aspect a kit for reducing a level of metallic contaminants from an aqueous stream, includes:
  a. at least one of an aluminum oxide sorption media and ion exchange media;
  b. a functionalized activated alumina media;
  c. instructions for lowering the pH of the metallic contaminant-contaminated aqueous stream to less than 6 before or after contacting the metallic contaminant-contaminated aqueous stream with the at least one of the alumina oxide sorption media and the ion exchange media;
  d. instructions for contacting the metallic contaminant-contaminated aqueous stream with the functionalized activated alumina media after lowering the pH of the contaminant-contaminated aqueous stream.

In some embodiments, the instructions for contacting the metallic contaminant-contaminated aqueous stream with functionalized alumina media further specifies a fixed temperature for said contacting. In some other embodiments, the fixed temperature is between 32° F. to 212° F.

In some embodiments, the pH is lowered to a range of 1.0 to 4.

In some embodiments, the instructions for lowering the pH of the metallic contaminant-contaminated aqueous stream to less than 6 further specifies the addition of an acid for said lowering of pH. In some embodiments, the pH is lowered by the addition of an acid to the aqueous stream to pH <5.5. In some embodiments, the acid is one or more acids selected from the group consisting of a mineral acid, an organic acid, and carbonic acid. In some embodiments, the acid is one or more acids selected from the group consisting of hydrochloric acid, sulfuric acid, nitric acid, phosphoric acid, and formic acid.

In some embodiments, the aluminum oxide sorption media is porous activated alumina. In some other embodiments, the activated alumina media further comprise at least one of iron, copper, and manganese.

In some embodiments, the functionalized activated alumina media includes a support substrate of aluminum oxide promoted with at least one of iron and copper and functional groups reacted onto the substrate to act as active bonding sites for the metallic contaminants. In some other embodiments, wherein the active bonding sites for metallic contaminant removal on the functionalized activated alumina media include at least one of aluminum, sulfur, ammonium, iron and copper compounds.

In some embodiments, the metallic contaminant includes a species of soluble selenium.

In some embodiments, the metallic contaminant includes at least one of selenate, selenite and selenocyanate species.

In some embodiments, the metallic contaminant-contaminated aqueous stream-to-media contact time is 1 minute to 24 hours.

BRIEF DESCRIPTION OF DRAWINGS AND FIGURES

DETAILED DESCRIPTION OF THE INVENTION

In some embodiments, the method, system, or kit disclosed herein utilizes a synergistic combination of low pH and a silica/anion reduction media that provides an improved environment for the removal of metallic contaminants, e.g., selenite and selenate by a functionalized activated alumina media. The combination works better than functionalized activated alumina media alone or the combination of any two of its parts to achieve high initial metallic contaminants, e.g., selenium, reductions. It especially improves the sustainability of selenium removal over a greater period of time and volume of water treated. In some embodiments, the method or kit disclosed herein is useful in waters containing a high level of ionic strength. The removal of selenium is used as an example for the removal of metallic contaminants by the method or kit described herein. However, the removal of other metallic contaminants is contemplated.

Figure 1:
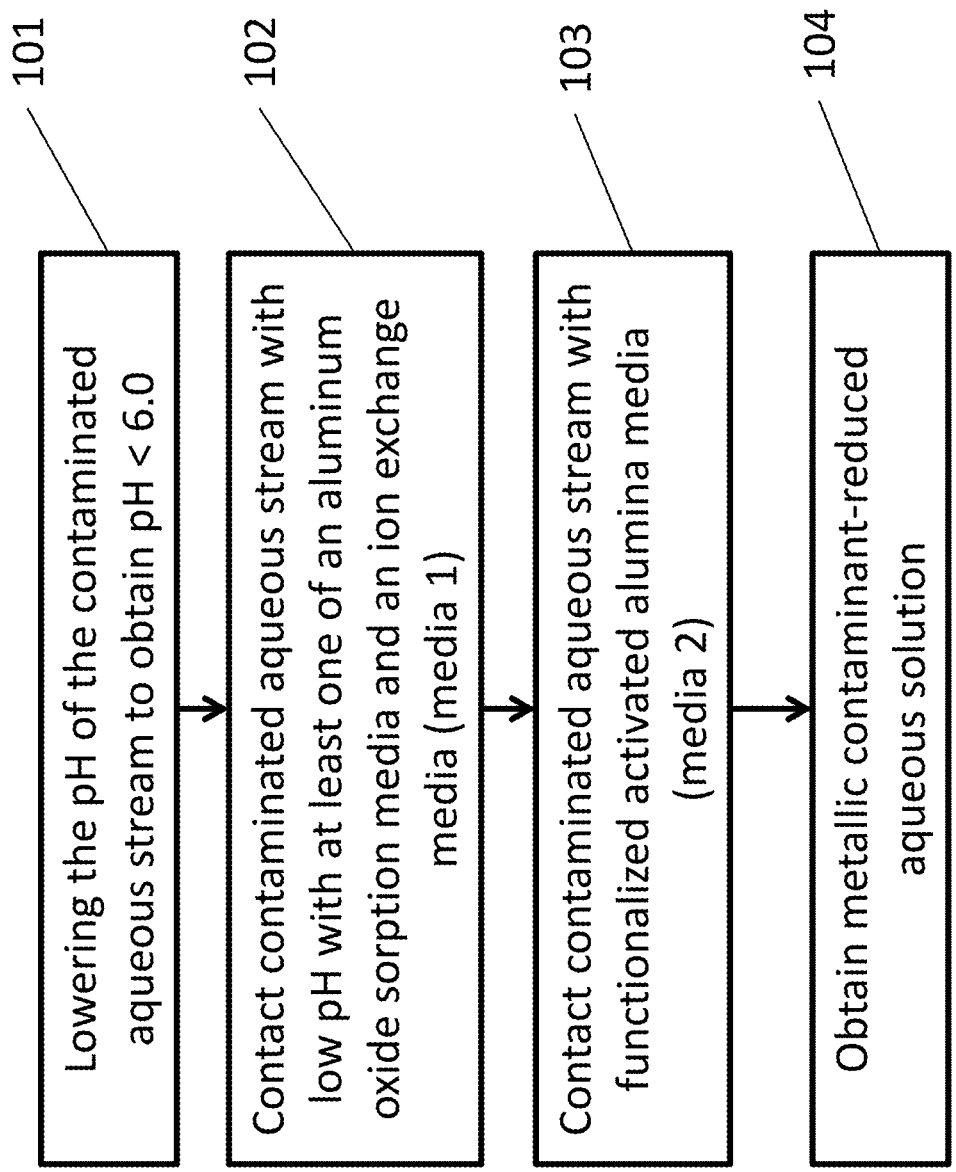
FIG. 1 illustrates the sequence of steps to be carried out in order to achieve the removal of the metallic contaminants according to an embodiment of this disclosure.
Figure 2:
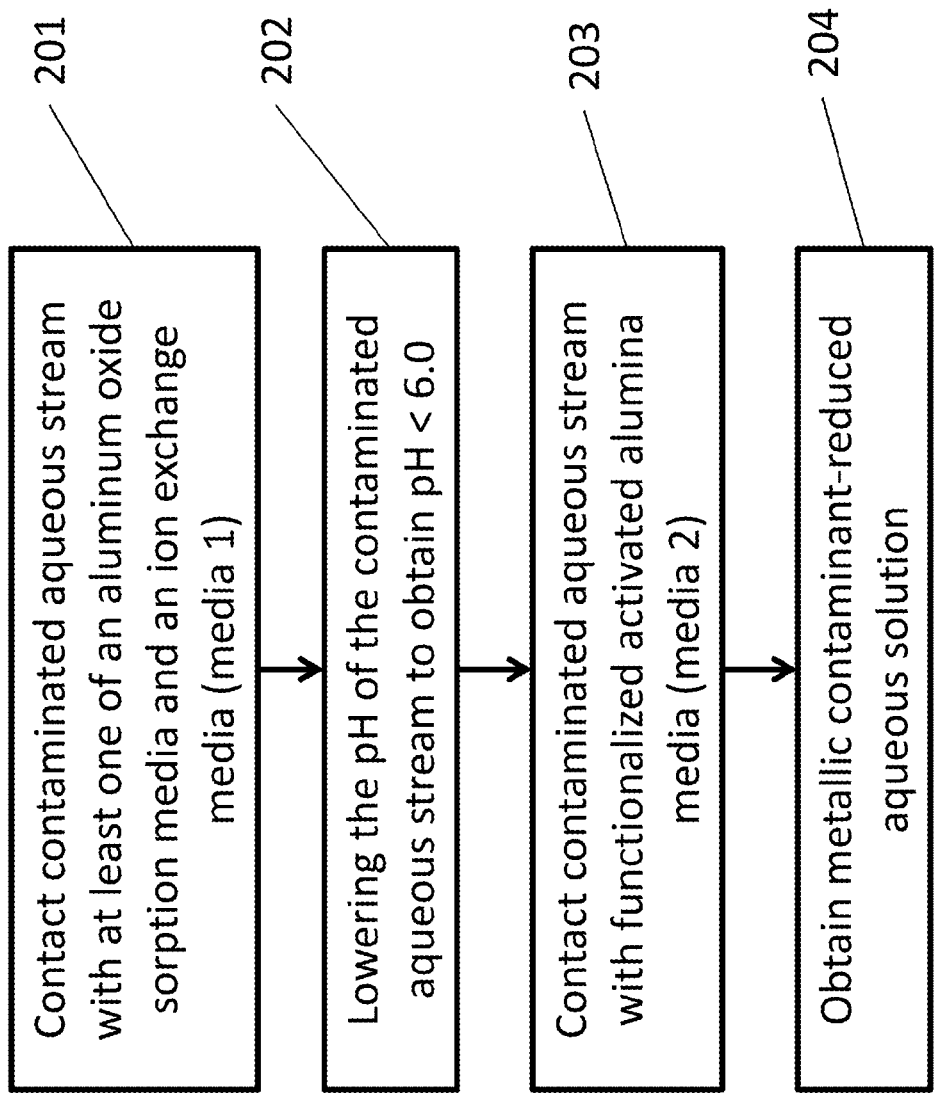
FIG. 2 illustrates the sequence of steps to be carried out in order to achieve the removal of the metallic contaminants according to an embodiment of this disclosure.

FIGS. 1 and 2 illustrate the sequence of steps to be carried out in order to achieve the removal of the metallic contaminants according to two embodiments of this disclosure. In the embodiment of the method shown in FIG. 1, the pH of the contaminated aqueous stream is first lowered to less than about 6, according to step 101. In some embodiments, the acid is selected from a group consisting of a mineral acid, an organic acid and carbonic acid. In certain embodiments, the pH is lowered by addition of an acid. In certain embodiments, the acid is selected from a group consisting of hydrochloric acid, sulfuric acid, nitric acid, phosphoric acid, and formic acid. This aqueous contaminated stream with pH less than 6 is then contacted with at least one an aluminum oxide sorption media and an ion exchange media (media 1) in step 102. Subsequently, the aqueous contaminated stream with pH less than 6 is contacted with the functionalized activated alumina media (media 2), in step 103. The contact with the at least one of the aluminum oxide sorption media and the ion exchange media and the functionalized activated alumina media results in the removal of the metallic contaminants and the metallic contaminant-reduced aqueous solution is obtained, as step 104. In the embodiment of the method shown in FIG. 2, the contaminated aqueous stream is first contacted with at least one of an aluminum oxide sorption media or an ion exchange media (media 1) in step 201 before the lowering of the pH of the contaminated aqueous stream to lower the pH below 6 in step 202. Subsequently, the aqueous contaminated stream with a pH less than 6 is contacted with the functionalized activated alumina media (media 2), in step 203. The contact with the at least one of the aluminum oxide sorption media and the ion exchange media and the functionalized activated alumina media results in the metallic contaminant-reduced aqueous solution in step 204. In some embodiment, the contacting the metallic contaminant-contaminated aqueous stream with functionalized activated alumina media is carried out at a fixed temperature. In certain embodiments, the fixed temperature is 32° F. to 212° F.

In some embodiments, the functionalized activated alumina media is the portion of the combination that provides the majority of the selenium removal. When used alone, this sorption media is capable of removing selenite, selenate and organic selenium species. Levels of 30% to 100% selenium removal have been achieved from various waters by flowing water through functionalized activated alumina media (unless otherwise stated, weight percent is used throughout). In selenate containing waters of high ionic strength, including those with high concentrations of silica and sulfate, selenium removal by functionalized activated alumina media alone may not be sustained for an adequate duration before suffering a loss in selenium removal performance.

This functionalized activated alumina media includes a promoted activated alumina support substrate or matrix bound to, associated with, or linked with, an active compound or functional group that provides a bonding site for metals removal. Non-limiting examples of promoted activated alumina substrates include iron promoted and copper promoted aluminum oxide. The support substrates are preferred to contain at least 0.1% iron, preferably as iron oxide, and/or at least 0.1% copper. In certain embodiments, the promoted activated alumumina includes iron or copper, individually or in combination, in the range of 5% to 15%. Iron and copper oxides in the substrate can be either present naturally in the aluminum oxide or the aluminum oxide can be promoted or doped with iron and/or copper. In some embodiments, the functional group is covalently or ionically bound to the support substrate or matrix. In other embodiments, the active compound may be associated with the support substrate or matrix, e.g., via van der waals force. In some embodiments, during use, the functional group bound to the support substrate or matrix may dissociate with the matrix or support and become an active compound associated with the support substrate or matrix via van der waals force.

Non-limiting examples of functional groups in functionalized activated alumina media that provide a bonding site for the removal of selenium and other contaminant metals include sulfur-containing functional groups, iron-sulfur compounds, copper-sulfur compounds, ammonium compounds and aluminum compounds. Specifically these include ferric chloride, ferric sulfate, copper sulfate, iron sulfide, copper sulfide, ammonium sulfate, ammonium sulfide, aluminum ammonium sulfate, aluminum oxide, aluminum sulfate, silica-aluminum oxides, sulfenic-acid, sulfinic acid sulfonic acid, sulfoxide. In some embodiments, the composition of functionalized activated alumina media contains sulfur- and ammonia-based active compounds reacted onto the surface in addition to the substrate composition of iron and aluminum oxide/hydroxide sites.

Without being limited to any particular theory, it is believed that in the media, the active compounds or functional group mentioned above are associated with or bound, bonded or linked to the activated alumina support substrate so that any loss of the active compound into the fluid stream is minimized. This results in a functionalized activated alumina media with a high and sustained ability to continuously remove targeted contaminants. In some embodiments, the stable active sites for the removal of contaminants are formed on the surface of the support media during the production reaction through covalent and ionic bonding between the support media and the other active ingredients, e.g., the active functional group. It is also believed that other attraction forces reduce the mobility of the active compound. For example, the active compound and support substrate may exhibit one or more of dipole-dipole interactions, hydrogen bonding and/or dispersion forces. Due to the formation of such bonds, the active compound cannot be completely solvated by the fluid and the dissolution rate of the active compound is significantly reduced, so that contaminant removal is sustained. In other embodiments, the active site/functional group is covalently/ionically bound to the support media so that it can't be solvated without first breaking these bonds.

It is further believed that mechanical forces can play a role in reducing the mobility of the active compound. For example, in some embodiments, the active compound and its complexes with the substrate can be lodged into small pores in the surface of the support substrate, thereby confining the material within the pores. In yet another aspect, a kit for removing metallic contaminant from an aqueous stream includes:

a) an aluminum oxide sorption media and an ion exchange media (media 1) and a functionalized activated alumina media (media 2);

b) instructions for lowering the pH of the aqueous stream to a pH of less than 6 before or after exposure toat least one of the alumina oxide sorption media and the ion exchange media (media 1);

c) instructions for contacting the aqueous stream with the at least one of the aluminum oxide sorption media and the ion exchange media (media 1) and the functionalized activated alumina media (media 2).

Figure 3:
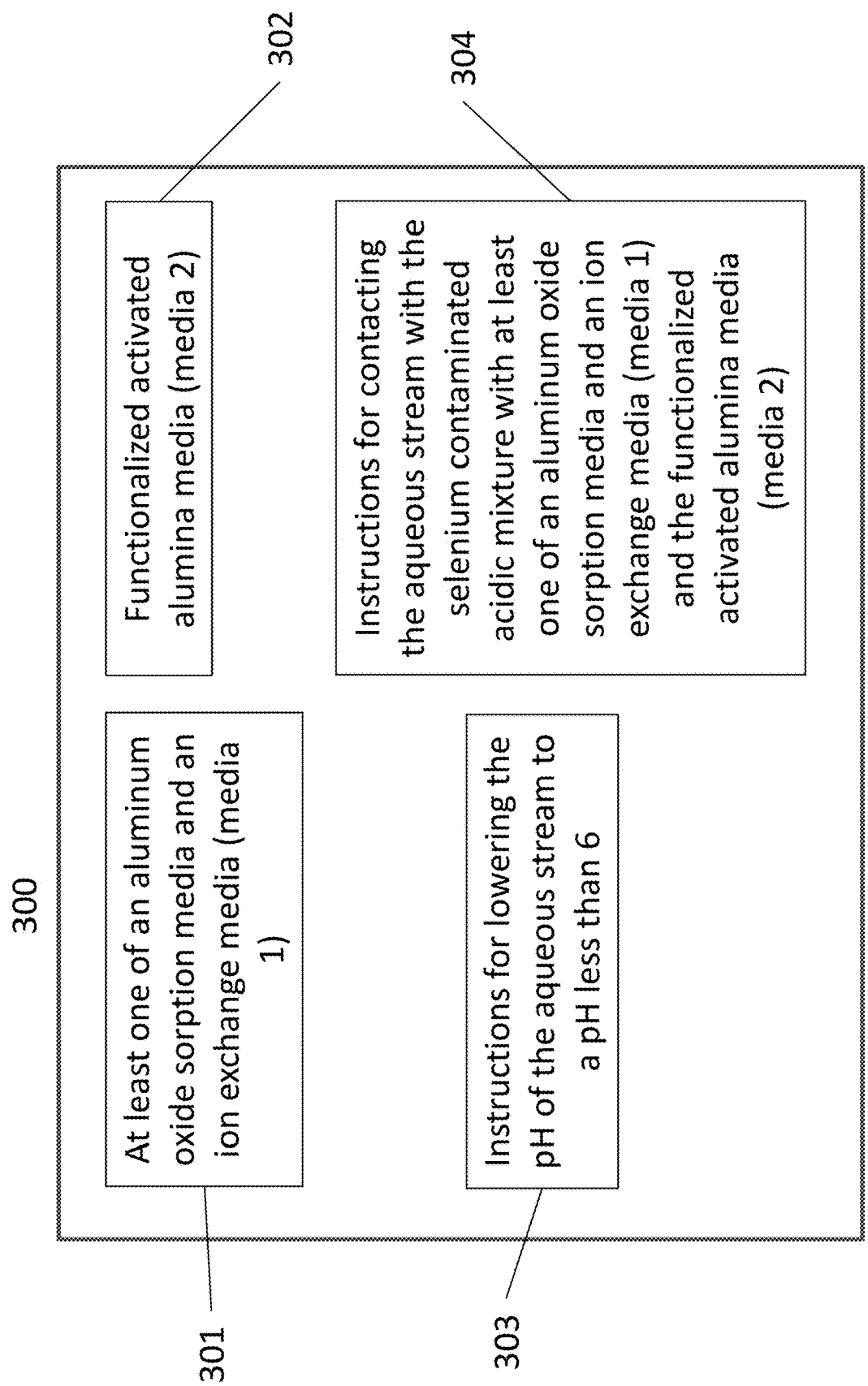
FIG. 3 shows a schematic of the kit 300 according to this disclosure.

FIG. 3 shows a schematic of the kit 300 according to this disclosure. The kit includes at least one of an aluminum oxide sorption media and an ion exchange media (media 1) 301, a functionalized activated alumina media (media 2) 302, instructions for lowering the pH of the aqueous stream to a pH less than 6 303, and instructions for contacting the aqueous stream with at least one of the aluminum oxide sorption media and the ion exchange media (media 1) and the functionalized activated alumina media (media 2) 304 to obtain the metallic contaminant-reduced aqueous solution.

In some embodiments, the pH is lowered by the addition of an acid to the aqueous stream to lower the pH to <5.5, or 1.0 to 4. In some embodiments, the pH of the aqueous stream is adjusted to about 0, 0.5, 1.0, 1.5, 2.0, 2.5, 3.0, 3.5, 4.0, 4.5, 5.0, 5.5, 6.0, or in a range bounded by any two pH values disclosed herein.

In some embodiments, the acid for pH adjustment can be a mineral acid, an organic acid or carbonic acid. In some embodiments, the acid is hydrochloric acid, sulfuric acid, nitric acid, phosphoric acid, or formic acid. The aluminum oxide sorption media (media 1) used in the kit may be porous activated alumina, and may further include at least one of iron, copper, and manganese.

In some embodiments, the functionalized alumina media (media 2) includes a support substrate of aluminum oxide promoted with at least one of iron and copper and functional groups reacted onto the substrate to act as active bonding sites for contaminants like selenium. The active bonding sites for contaminant removal on the functionalized alumina may contain at least one of aluminum, sulfur, ammonium, iron and copper compounds. The metallic contaminant may include at least one of the species of soluble selenium, selenate, selenite and selenocyanate species.

In certain embodiments, the metallic contaminant-contaminated aqueous stream-to-media contact time is 1 minute to 24 hours. In certain embodiments, the metallic contaminant—contaminated aqueous stream-to-media contact is carried out at a fixed temperature between 32° F. to 212° F.

In some embodiments the media is present in a packed bed tank through which the metallic-contaminant—contaminated aqueous stream passes to result in a volume ratio of the media to metallic contaminant contaminated water. In certain embodiments, the volume ratio of the media to the metallic contaminant contaminated water is 1:99, is 10:90 is 20:80, is 30:70, is 40:60, is 50:50, is 60:40, is 70:30, is 80:20, is 90:10, or , is 99:1.

Non-limiting examples of contaminants removed by functionalized activated alumina media include mercury, selenium, arsenic, vanadium, tin, chromium, cadmium, molybdenum, lead, copper, manganese, antimony, zinc, nickel, uranium and all the heavy and D-block or transition metals. Other examples of contaminants removed by the system, method, or kit disclosed herein include fluoride, strontium, barium, sulfate, phosphate, nitrate, nitrite, boron, chloride and radioactive substances. These contaminants are reduced from a fluid stream by one or more of the processes of chemical adsorption/chemisorption, absorption and/or physical adsorption.

Examples where sustainability of removal are an issue are in mining waters and power plant flue gas desulfurization (FGD) scrubber waters, in which most of the selenium present is in the form of selenate. These waters are also typically high in ionic strength, containing high levels of sulfate, calcium, magnesium and chloride. Table 1 illustrates the difficulty that can be encountered in maintaining selenium removal over time by functionalized alumina alone with no pretreatments. All three waters exhibit an increase in the effluent selenium concentration as a function of bed volumes (BV) treated by flow through functionalized activated alumina media.

TABLE 1

|  | Inlet Se µg/L | Selenium after 2 BV Treated µg/L | Selenium after 13 BV Treated µg/L | Selenium after 45 BV Treated µg/L |
|---|---|---|---|---|
| Eastern USA FGD Water | 1700 | 460 | 650 | 800 |
| Mining Water | 508 | 47 | 265 | 375 |
| Coal Mining Water | 128 | 14 | 28 | 60 |

The system, method, or kit disclosed herein enables the sustainability of selenium removal to be maintained by a synergistic combination of low pH and sequential treatment by activated alumina (media 1) and functionalized activated alumina media (media 2).

EXAMPLE 1

An aqueous feed stream containing 460 parts per billion of selenium was reduced to pH 3.05 with hydrochloric acid and pumped at a 60 minute water-to-media contact time (contact time (CT) is equal to the volume of the vessel divided by stream flow rate) at ambient temperature first through a vessel containing plain activated alumina (media 1) and then through a vessel containing functionalized activated alumina media (media 2). The vessel in this example, and all the subsequent examples, were filled to a media volume of 461 cubic centimeters. Since the densities of the aluminum oxide sorption media (media 1) and the functionalized activated alumina media (media 2) are different, different mass amounts were used to arrive at 461 cubic centimeters of volume. In these studies, holding the media volume constant allowed the contact time of each bed to be the same. Also, an empty bed volume (BV) is equal to the vessel volume, so one bed volume was 461 cubic centimeters in all of these examples. Selenium removal at pH 3.05 was compared to feed stream at pH 6.0 and pH 9.2 flowing through an identical media system and summarized in Table 2.

TABLE 2

| Media 1 + Media 2 System | % Se Removed @ 4 Bed Volumes Treated | % Se Removed @ 13 Bed Volumes Treated |
|---|---|---|
| pH adjusted to 3.05 | 99 | 99 |
| pH of 6.0 | 95 | 75 |
| pH adjusted to 9.24 | 93 | 73 |

For the data provided in Table 3, the aqueous feed stream was a selenate containing water received from a mine site in the United States. In addition to selenium, this water contained 61 mg/L silica, 185 mg/L calcium, 154 mg/L magnesium, 554 mg/L sulfate, 222 mg/L chloride, 6 mg/L fluoride and 340 µg/L zinc, at a pH of 6.0.

In addition to selenium removal, the system, method, or kit disclosed herein simultaneously removed other contaminants and potential competing anions to selenium. The majority of the anion silica removal was accomplished by media 1, which is one intended use of this media.

TABLE 3

| Low pH of 3.05 + Media 1 + Media 2 System | Influent | Effluent from Media 1 @ 13 BV Treated | Effluent from System @ 13 BV Treated |
|---|---|---|---|
| Silica | 61 mg/L | 8.0 | 0.3 |
| Fluoride | 6 mg/L | — | Not detected |
| Zinc | 340 µg/L | — | 10 µg/L |

EXAMPLE 2

An aqueous feed stream containing 128 parts per billion of selenium, present all as selenate, was reduced to pH 2.8 with hydrochloric acid and then pumped at a 20 minute per media contact time and ambient temperature, first through a vessel containing plain activated alumina (media 1) and then pumped through a vessel containing functionalized activated alumina media (media 2).

The aqueous feed stream was a selenate containing water modeled from a USA coal mine pond. In addition to selenium, which was added as sodium selenate, it contained 76 mg/L calcium, 29 mg/L magnesium, 302 mg/L sulfate, 18 mg/L chloride and 15 mg/L chloride, at a pH of 7.0.

TABLE 4

| | Influent Se ppb | Effluent Se @ 4 BV Treated | Effluent Se @ 23 BV Treated |
|---|---|---|---|
| pH 2.8 + media 1 + media 2 | 128 ppb | Not detected | Not detected |
| Media 2 only, pH 7 | 128 ppb | 14 ppb | 42 ppb |

As shown in Table 4, addition of the low pH and the activated alumina media (media 1) as pretreatments ahead of functionalized activated alumina media (media 2) provided both a higher initial level of selenium removal and this removal was sustained over functionalized activated alumina media alone.

EXAMPLE 3

The water from Example 2 was tested further to determine that a novel unexpected synergy exists among the three components of the system, method, or kit disclosed herein, i.e. low pH+ media 1+ media 2. Alone and in combination with only one other of the components, the selenium removal is much less and/or not sustained.

TABLE 5

| Removal System | Inlet Selenium | Effluent Se @ 4 BV Treated | Effluent Se @ 22 BV Treated |
|---|---|---|---|
| pH 3 + Media 1 + Media 2 | 128 | Not detected | Not detected |
| pH 2.7 + Media 1 | 137 | 50 | 76 |
| pH 2.7 + Media 2 | 137 | Not detected | 25 |
| pH 7.5 + Media 1 | 347 | 317 | 308 |
| pH 7.0 + Media 2 | 128 | 14 | 42 |

It should now be apparent that various embodiments of the present invention accomplish the object of this invention. Sustained removal of selenium, especially selenate in high ionic strength waters, can be achieved in aqueous streams by the combination of low pH and activated alumina media as a pretreatment for competing anion removal ahead of functionalized activated alumina media.

It should be appreciated that the present invention is not limited to the specific embodiments described above, but includes variations, modifications and equivalent embodiments defined by the following claims.

What is claimed is:

1. A method for reducing a level of selenium contaminants from an aqueous stream, comprising:
   a. lowering the pH of a selenium contaminant- contaminated aqueous stream to a pH less than 6;
   b. contacting the selenium contaminant-contaminated aqueous stream with a first media, said first media comprising an aluminum oxide sorption media; and
   c. contacting the selenium contaminant-contaminated aqueous stream with a second media, said second media comprising a functionalized activated alumina media, wherein the functionalized activated alumina media comprises:

a support substrate of activated aluminum oxide promoted with at least one of iron and copper at a weight percent of at least 0.1%; and sulfur-containing functional groups bound to the support substrate, wherein the first media does not have sulfur-containing functional groups bonded thereto.

2. The method of claim 1, wherein said contacting the selenium contaminant-contaminated aqueous stream with the aluminum oxide sorption media is followed by said lowering the pH of a selenium contaminant-contaminated aqueous stream to a pH of less than 6, and wherein said contacting the selenium contaminant-contaminated aqueous stream with the aluminum oxide sorption media and said lowering the pH of selenium contaminant contaminated aqueous stream precedes said contacting the selenium contaminant-contaminated aqueous stream with the functionalized activated alumina media.

3. The method of claim 1, wherein said lowering the pH of selenium contaminant-contaminated aqueous stream to pH less than 6 is followed by said contacting the selenium contaminant-contaminated aqueous stream with the aluminum oxide sorption media, and wherein said lowering the pH of selenium contaminant contaminated aqueous stream and said contacting the selenium contaminant-contaminated aqueous stream with the aluminum oxide sorption media precedes said contacting the selenium contaminant-contaminated aqueous stream with the functionalized activated alumina media.

4. The method of claim 1, wherein the pH is lowered to a range of 1.0 to 4.

5. The method of claim 1, wherein the lowering of pH of the selenium contaminant-contaminated aqueous stream is carried out by the addition of an acid.

6. The method of claim 5, wherein the acid is one or more acids selected from the group consisting of a mineral acid, an organic acid and carbonic acid.

7. The method of claim 5, wherein the acid is one or more acids selected from the group consisting of hydrochloric acid, sulfuric acid, nitric acid, phosphoric acid, and formic acid.

8. The method of claim 5, wherein the pH is lowered by the addition of an acid to the aqueous stream to pH<5.5.

9. The method of claim 1, wherein contacting the selenium contaminant-contaminated aqueous stream with a functionalized activated alumina media forms a contaminant-reduced acidic aqueous solution, the method further comprising the steps of:
 a. increasing the pH of the contaminant-reduced acidic aqueous solution; and
 b. discharging the selenium contaminant-reduced aqueous solution.

10. The method of claim 1, wherein the aluminum oxide sorption media is porous activated alumina.

11. The method of claim 10, wherein the activated alumina media further comprises at least one of iron, copper, and manganese.

12. The method of claim 1, wherein the functionalized activated alumina media further include at least one of aluminum, ammonium, iron and copper compounds to act as active bonding sites.

13. The method of claim 1, wherein the selenium contaminant comprises a species of soluble selenium.

14. The method of claim 1, wherein the selenium contaminant comprises at least one of selenate, selenite and selenocyanate species.

15. The method of claim 1, wherein the selenium contaminant-contaminated aqueous stream-to-media contact time is 1 minute to 24 hours.

* * * * *